United States Patent
Vlasyuk et al.

(10) Patent No.: US 11,972,307 B2
(45) Date of Patent: Apr. 30, 2024

(54) AUTOMATED ASSISTANT FOR GENERATING, IN RESPONSE TO A REQUEST FROM A USER, APPLICATION INPUT CONTENT USING APPLICATION DATA FROM OTHER SOURCES

(71) Applicant: GOOGLE LLC, Mountain View, CA (US)

(72) Inventors: Bohdan Vlasyuk, Zurich (CH); Behshad Behzadi, Freienbach (CH); Mario Bertschler, Zurich (CH); Denis Burakov, Zurich (CH); Daniel Cotting, Islisberg (CH); Michael Golikov, Merlischachen (CH); Lucas Mirelmann, Zurich (CH); Steve Cheng, Los Altos, CA (US); Sergey Nazarov, Zurich (CH); Zaheed Sabur, Baar (CH); Jonathan Lee, Brooklyn, NY (US); Lucia Terrenghi, Zurich (CH); Adrian Zumbrunnen, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 684 days.

(21) Appl. No.: 17/049,696

(22) PCT Filed: Aug. 6, 2019

(86) PCT No.: PCT/US2019/045246
§ 371 (c)(1),
(2) Date: Oct. 22, 2020

(87) PCT Pub. No.: WO2020/226675
PCT Pub. Date: Nov. 12, 2020

(65) Prior Publication Data
US 2021/0216384 A1 Jul. 15, 2021

Related U.S. Application Data

(60) Provisional application No. 62/843,998, filed on May 6, 2019.

(51) Int. Cl.
*G06F 9/54* (2006.01)
*G06F 3/16* (2006.01)
(Continued)

(52) U.S. Cl.
CPC .............. *G06F 9/547* (2013.01); *G06F 3/167* (2013.01); *G06F 40/166* (2020.01); *G06F 40/35* (2020.01);
(Continued)

(58) Field of Classification Search
CPC ........ G06F 9/547; G06F 3/167; G06F 40/166; G06F 40/35; G06F 40/30; G10L 15/22; G10L 15/26; G10L 2015/223
See application file for complete search history.

(56) References Cited

U.S. PATENT DOCUMENTS 8,839,266 B1   9/2014  Partridge et al.
8,930,191 B2 *  1/2015  Gruber ................ G06F 16/9537
                                                                704/251

(Continued)

FOREIGN PATENT DOCUMENTS

WO    2012098359    7/2012
WO    2017019319    2/2017

OTHER PUBLICATIONS

Aura, "Best speech-to-text API for apps", discloses method for speech-to-text recognition, pp. 1-7. (Year: 2017).*

(Continued)

*Primary Examiner* — Kevin L Young
*Assistant Examiner* — Phuong N Hoang
(74) *Attorney, Agent, or Firm* — Gray Ice Higdon

(57) ABSTRACT

Implementations set forth herein relate to an automated assistant that can be invoked while a user is interfacing with (Continued)

a foreground application in order to retrieve data from one or more different applications, and then provide the retrieved data to the foreground application. A user can invoke the automated assistant while operating the foreground application by providing a spoken utterance, and the automated assistant can select one or more other applications to query based on content of the spoken utterance. Application data collected by the automated assistant from the one or more other applications can then be used to provide an input to the foreground application. In this way, the user can bypass switching between applications in the foreground in order to retrieve data that has been generated by other applications.

18 Claims, 7 Drawing Sheets

(51) Int. Cl.
  *G06F 40/166* (2020.01)
  *G06F 40/35* (2020.01)
  *G10L 15/22* (2006.01)
  *G10L 15/26* (2006.01)

(52) U.S. Cl.
  CPC .............. *G10L 15/22* (2013.01); *G10L 15/26* (2013.01); *G10L 2015/223* (2013.01)

(56) References Cited

U.S. PATENT DOCUMENTS

| | | | | |
|---|---|---|---|---|
| 2015/0121227 | A1* | 4/2015 | Peng | G10L 13/047 715/727 |
| 2016/0293164 | A1* | 10/2016 | Shi | G10L 15/1815 |
| 2017/0068423 | A1* | 3/2017 | Napolitano | G06F 16/489 |
| 2017/0352352 | A1* | 12/2017 | Wang | G06F 3/167 |
| 2018/0324115 | A1 | 11/2018 | Aggarwal et al. | |
| 2021/0216384 | A1* | 7/2021 | Vlasyuk | G06F 9/547 |

OTHER PUBLICATIONS

Stack, "performing voice processing in real time on Android phones", pp. 1-2. (Year: 2017).*
Australian Government; Examination Report No. 2 issued in Application No. 2019444436, 2 pages, dated Nov. 22, 2022.
Intellectual Property India; Examination Report issued in Application No. 202127045294; 7 pages; dated Apr. 1, 2022.
European Patent Office, Invitation to Pay Additional Fees, 19 pages, dated Dec. 20, 2019.
European Patent Office; International Search Report and Written Opinion of Ser. No. PCT/US2019/045246; 23 pages; dated Feb. 11, 2020.
Australian Government; Notice of Acceptance issued in Application No. 2019444436, 3 pages, dated Dec. 15, 2022.
Australian Government; Examination Report No. 1 issued in Application No. 2019444436, 2 pages, dated Aug. 12, 2022.
European Patent Office; Result of Consultation issued for Application No. 19753588.3, 3 pages, dated Aug. 11, 2023.
Australian Government; Examination Report issued for Application No. 202301871, 3 pages, dated Oct. 5, 2023.
China National Intellectual Property Administration; Notification of First Office Action issued in Application No. 201980096033.1; 25 pages; dated Oct. 27, 2023.
European Patent Office; Intention to Grant issued for Application No. 19753588.3, 50 pages, dated Oct. 19, 2023.

* cited by examiner

AUTOMATED ASSISTANT FOR GENERATING, IN RESPONSE TO A REQUEST FROM A USER, APPLICATION INPUT CONTENT USING APPLICATION DATA FROM OTHER SOURCES

BACKGROUND

Humans may engage in human-to-computer dialogs with interactive software applications referred to herein as "automated assistants" (also referred to as "digital agents," "chatbots," "interactive personal assistants," "intelligent personal assistants," "conversational agents," etc.). For example, humans (which when they interact with automated assistants may be referred to as "users") may provide commands and/or requests using spoken natural language input (i.e., utterances) which may in some cases can be converted into text and then processed, and/or by providing textual (e.g., typed) natural language input.

In many instances, a user can invoke an automated assistant to initialize an application, such as a music streaming application, in order to preserve computational resources that might otherwise be wasted shifting through applications in a foreground. However, such interactions can be limited to one-way communications from a user to an application via an automated assistant. By limiting these interactions in this way, a user may find themselves repeating inputs to the automated assistant in order to convey similar information to different applications. Because many automated assistant inputs are provided via spoken utterance, this can result in the automated assistant repetitively and unnecessarily processing similar spoken utterances—considering an instance of a repeated spoken utterance may have already been processed. This can consume processor resources, as well as network bandwidth when such spoken utterances are processed at a remote server device.

SUMMARY

Some implementations set forth herein relate to an automated assistant of a client device that can fulfill commands, which are directed at a particular application that is installed at the client device, but capable of being fulfilled by the automated assistant using application data from one or more other applications installed at the client device. As an example, a user can provide a query to an automated assistant while the user is interacting with a particular application, such as a thermostat application. The user can be interacting with the thermostat application in order to schedule operations of the thermostat while the user is away on vacation during the following month. While interacting with the thermostat application, the user can arrive at a graphical user interface that is requesting the user to provide specific dates and/or times that the user will be away from their home. The thermostat application can use the dates and/or times as part of control data for limiting an output of an HVAC system, or another heating and/or cooling system, in a home of the user while the user is away.

In order to quickly provide the dates and times, the user can invoke the automated assistant in order that the automated assistant can retrieve the data from one or more sources. For example, prior to the user interacting with the thermostat application, the user may have provided dates and/or times to other applications for booking their vacation. For example, the user may have used other application(s) to book various aspects of their vacation and, as a result, the other application(s) can have locally accessible data, for example stored in memory of the device on which the thermostat application is installed, related to the dates and/or times (e.g., locally stored confirmations or summaries of the booked aspects). The other applications can include a flight application, from which the user booked their flights, and a ride sharing application, from which the user booked their ride to and from the airport. Although the user can have a variety of different applications installed on their respective computing device, the automated assistant can receive a request from the user to retrieve dates and times associated with their vacation, and generate responsive data based on the application data from the other applications. For instance, the user can provide a spoken utterance such as, "Assistant, use my San Francisco vacation dates and times," when the user is accessing the graphical user interface that is requesting the specific dates and times for controlling the thermostat.

In response to receiving the spoken utterance, the automated assistant can access application data via a variety of different applications, and, in particular, retrieve data that is associated with content from the spoken utterance of the user. The automated assistant can search the application data for particular terms such as "San Francisco" and "vacation," in order to identify data that is correlated to the terms. In some implementations, the automated assistant can provide a request to each application of one or more applications installed at the computing device, in order to cause the one or more applications to generate relevant content in response to a respective command. For example, a request from an automated assistant can include content such as, "Assistant_Request{Terms('San Francisco', 'vacation'); Type('Date')}." In response to a particular application receiving the command, the particular application can identify application data that is formatted as a "Date" and is associated with the terms "San Francisco" and "vacation." When the particular application identifies content that is responsive to the request, the particular application can provide, to the automated assistant, data that characterizes to content identified by the particular application.

In some implementations, the application data can include various data corresponding to the term "vacation," such as image folders and other content provided by various applications. In order to filter out such application data, the automated assistant can use content provided by a particular application that the user is interacting with (e.g., the thermostat application) as a basis for filtering the application data further. For example, the graphical user interface that includes fields for specific dates and times can include natural language content characterizing how the thermostat application intends to use the dates and times. For instance, the graphical user interface can identify fields for the dates and times as "upcoming" dates and times that the user will be away from their home. Therefore, based on one or more temporal modifiers (e.g., "upcoming") provided at the graphical user interface, the automated assistant can further filter the application data to identify certain content that is associated with future (i.e., upcoming) dates and times.

When the automated assistant has completed filtering the application data and has identified suitable data from which to render responsive content, the automated assistant can generate responsive data that is based on the filtered application data. The responsive data can include application data from multiple different applications, such as the flight application and the ride sharing application. The responsive data can identify dates and times at which the user will be using the ride sharing application for transit to and from an airport, and other dates and times at which the user will be leaving and returning on their flight. In some implementations, the user can be prompted to confirm the responsive data prior to the automated assistant entering the responsive data into suitable fields of the graphical user interface. Additionally, or alternatively, the user can be provided with an option to edit the responsive data prior to the automated assistant entering the responsive data into the fields. In some implementations, the automated assistant can enter the responsive data into the fields of the graphical user interface in response to the user providing the spoken utterance. The user can thereafter edit any content entered into the fields of the graphical user interface by the automated assistant.

When the automated assistant has entered the responsive content into the fields, the user and/or the automated assistant can cause the application to submit the responsive content in furtherance of the application performing one or more actions. For example, using the dates and times provided by the automated assistant, the application can store a schedule of operations for the HVAC system (or other heating/cooling system) to operate, in order to reduce power consumption while the user is away on vacation. In this way, the user can streamline interactions with applications for effectuating such efficiencies, without having to switch between varieties of different applications. In other words, in response to a spoken utterance, the automated assistant can request (directly and/or via an operating system of the client device) application data from various application(s) determined to be relevant to the spoken utterance, and utilize returned application data in fulfilling an intent of the spoken utterance. This can be performed more quickly, with less screen time, and/or with less processing resources than if the user instead had to open each of the various application(s) and manually navigate to the relevant application data in those application(s). The quicker performance of the fulfillment can shorten an overall duration of a user-client device interaction in fulfilling the intent. Furthermore, by effectuating these interactions between the user and the automated assistant on-device, network bandwidth can be preserved, as a result of less (or even no) communications between the computing device and separate server devices.

In some implementations, an automated assistant can query multiple different applications for responsive data in order to provide content to a user who has provided a particular request for certain data. For example, the user can provide a request such as, "Assistant, show me statuses of my current home devices." In response to receiving the request at a computing device that includes the automated assistant, the computing device can generate one or more requests to be provided to multiple different applications installed at the computing device. In some implementations, the automated assistant can generate the one or more requests based on content of the spoken utterance or other input to the automated assistant from the user. For example, a natural language understanding engine at the computing device can be used to process the spoken utterance from the user (e.g., a transcription thereof generated by an on-device speech recognition engine) and generate corresponding natural language understanding data. Based on the natural language understanding data, the computing device can generate a request that can be transmitted to a subset of applications that are a subset of a group of applications that are installed at the computing device.

In some implementations, the request can identify a type of subgroup of applications of the group of applications that are installed at the computing device. For example, in response to the aforementioned spoken utterance, the automated assistant can generate a request such as, "ASSIS-TANT_QUERY (application_type {home_control}; data_type {status})." The request can identify: a type of application that should receive the request from the automated assistant, and a particular type of data that should be provided by an application that received the request. In some implementations, the automated assistant can access a listing of applications, which can include a designation for each application and corresponding type(s) for the application. For example, some applications in the listing of applications can be correlated to a social media type of application, and other applications in the listing of applications can be correlated to a health and fitness type of application. Therefore, as provided in the example, the automated assistant can identify types of applications in the listing of applications that are related to "home control." These types of applications can include applications that can communicate with an IoT device connected to a network within a home of the user.

Once the automated assistant has identified a subgroup of applications of a group of applications installed at the computing device, the automated assistant can cause the request to be transmitted to each application in the subgroup of applications (without transmission of the request to any application(s) not in the subgroup). For instance, each home control type of application in the subgroup of applications can be provided the aforementioned request, which seeks to retrieve status data from each home control type of application. Each home control type of application can communicate with the automated assistant via an application programming interface (API). The communication can optionally be via the operating system of the client device, which can validate the request from the automated assistant and/or validate the applications utilizing, for example, validation key(s) of each. Therefore, when each home control type of application receives their respective request, each home control type of application can accurately provide responsive data. For example, in response to a thermostat application receiving the request from the automated assistant, the thermostat application can generate responsive data characterizing a current status of a thermostat located in the home of the user. In some implementations, content of the responsive data can be correlated to content of the received request. For instance, the responsive data can include content such as, "ASSISTANT_RESPONSE(status{"Heat on at 72 degrees."}). In some implementations, when an application receives a request that the application cannot respond to, the application can provide error data indicating that one or more errors occurred in response to receiving the request. Furthermore, in some implementations, when an application receives a request for responsive data, processes the request, but has no suitable responsive data to provide, the application can provide an indication that the application has no corresponding data to provide in response to the request.

In response to receiving responsive data from multiple different applications in the subgroup of applications, the automated assistant can organize all the responsive data into a format that can be presented to the user. For example, in response to the user providing the spoken utterance, "Assistant, show me statuses of my home devices," the automated assistant can render graphical content that incorporates at least a portion of responsive data provided by each application in the subgroup of applications. For instance, the automated assistant can cause a display panel of the computing device to render natural language content characterizing a listing of content from the responsive data from the different applications. The listing of content can be for example, "Thermostat: Heat on at 72 degrees; Dehumidifier: Low power mode; Alarm System: Secured-away." In this way, the user is able to see various combinations of data from different applications without requiring the various applications to constantly and/or periodically self-report information to an operating system of the computing device, thereby wasting memory and/or other storage resource(s) at the computing device. Rather, each application can be responsive to a structured request from the automated assistant, in order to provide up-to-date information to the user with minimal utilization of resources. Thus, pertinent data for a spoken utterance can be requested on-demand from corresponding application(s) in various implementations, enabling the corresponding application(s) to respond utilizing data from their own on-device storage (and optionally through communicating with corresponding remote server(s)), which can be restricted to being accessed only by the corresponding application(s). This can be more efficient, storage wise and/or processor requirement wise, than maintaining a separate local storage that preemptively collates data from multiple applications, effectively duplicating already present data. Such storage and/or processor efficiencies provided by techniques disclosed herein can be beneficial for client devices that implement the techniques, as such client devices often have relatively limited storage and/or processor capabilities.

The above description is provided as an overview of some implementations of the present disclosure. Further description of those implementations, and other implementations, are described in more detail below.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 4 illustrates a method for invoking an automated assistant to retrieve data from one or more different applications, and then provide the retrieved data to an application that a user is interacting with.

DETAILED DESCRIPTION

Figure 1A:
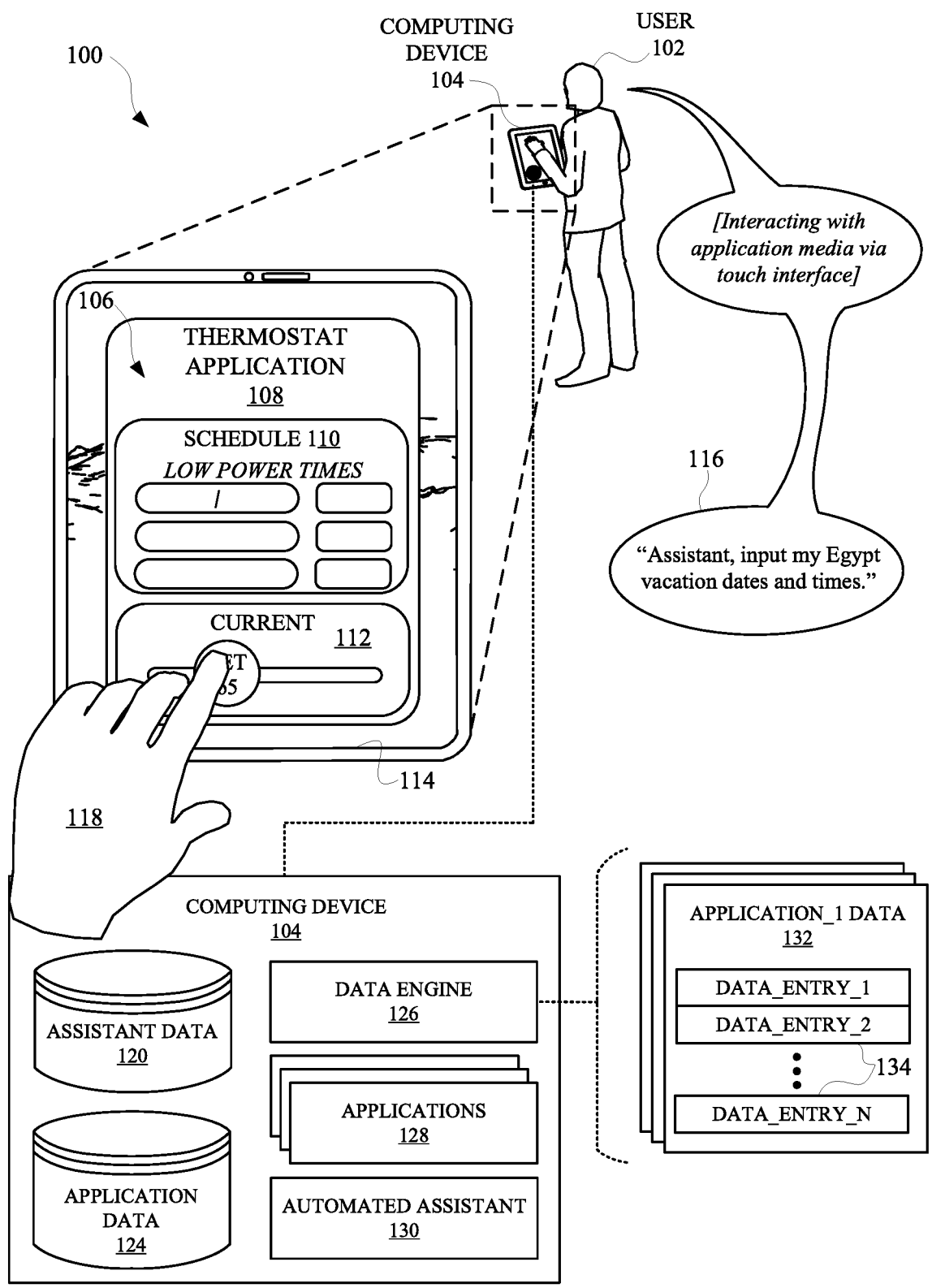
FIG. 1A and FIG. 1B an automated assistant being employed to provide data for an application using application data from one or more other applications installed at a computing device.
Figure 1B:
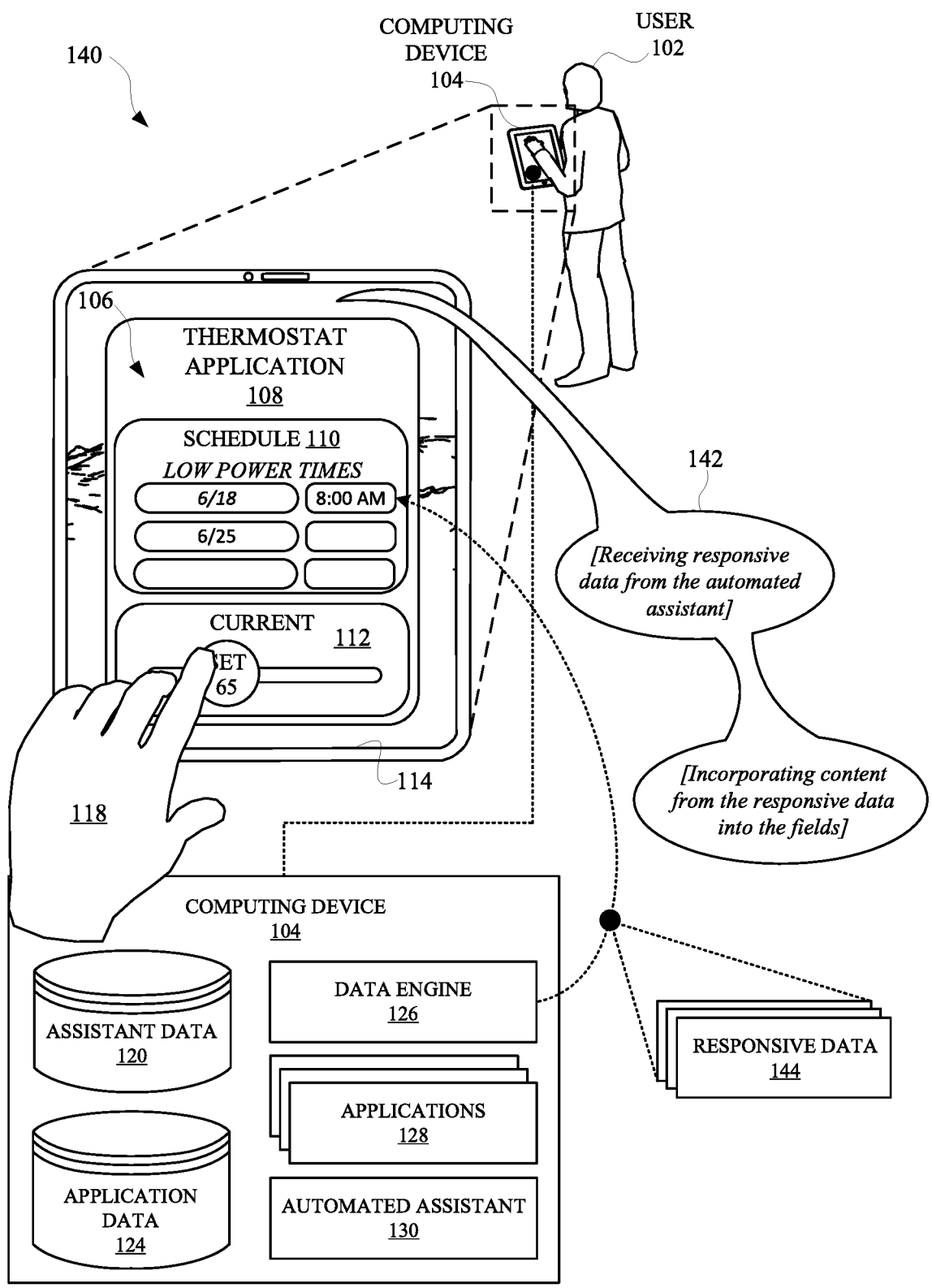

FIG. 1A and FIG. 1B illustrate a view 100 and a view 140, respectively, of an automated assistant 130 being employed to provide data for an application using application data from one or more other applications installed at a computing device 104. The user 102 can be interacting with a thermostat application 108, which can include a graphical user interface 106, which is being rendered at a display panel 114 of the computing device 104. The user 102 can be interacting with the thermostat application 108 in order to schedule periods of time in which the thermostat application 108 should operate an HVAC system, or another heating/cooling system, in a home of the user 102 according to low power mode. In order to schedule the thermostat application 108 to operate in this way, the user 102 can navigate to schedule 110 interface of the thermostat application 108. The schedule 110 interface can provide one or more fields for the user 102 to input dates and times for when the HVAC or other heating/cooling system should operate in the low power mode.

While interacting with the thermostat application 108 to schedule the low power mode, the user 102 can provide a spoken utterance 116 such as, "Assistant, input my Egypt vacation dates and times." In some implementations, the user 102 can be interacting with another interface 112 of the thermostat application 108 when the user 102 provides the spoken utterance 116, for example, by modifying a temperature setting with their hand 118 via a touch input at the display panel 114. In response to receiving the spoken utterance 116, the computing device 104 can process audio data corresponding to the spoken utterance 116 and determine (e.g., using a natural language understanding (NLU) process) that the user 102 is requesting that the automated assistant 130 fill in one or more fields of the schedule 110.

Based on determining that the user 102 has requested that the automated assistant 130 fill in data for the schedule 110, the automated assistant 130 can generate one or more requests for obtaining data suitable for incorporating into fields of the schedule 110. For example, the automated assistant 130 can cause a data engine 126 to access assistant data 120 and/or application data 124 that is associated with one or more applications 128 installed at the computing device 104. The data engine 126 can request that one or more applications 128 provide data in response to a particular request that is based on: the spoken utterance 116, and/or content provided by the thermostat application 108. For example, the data engine 126 can request that one or more applications 128, which may be installed locally at the computing device 104, provide data that is formatted as dates and associated with a particular location and activity type, such as the terms "San Francisco" and "vacation."

The data engine 126 can receive responses from one or more applications 128 that are able to respond to the request. For example, in some implementations one or more applications 128 may not respond to the request with corresponding data because such corresponding data is not generated by the application and/or has not been recently accessed via the application. However, one or more applications 128 that do have corresponding data can respond to the requests. The data engine 126 can process responses from the applications 128 in order to compile together application data 132 that includes entries 134, which can be incorporated into the schedule 110 of the thermostat application 108 via operation(s) 142. For example, application data 132 corresponding to a calendar application of the one or more applications 128 can be processed via the automated assistant 130 in order to generate data entries 134. The calendar application can provide data characterizing calendar entries that detail a location of multiple events in San Francisco. In response to receiving the data from the calendar application, the data engine 126 can select portions of the data in order to generate one or more data entries 134 that can be input into the schedule 110. For example, the data engine 126 can identify portions of data that are formatted as dates and times, in order to generate the entries 134.

When the data engine 126 has compiled application data 132 for one or more different applications that responded to requests from the data engine 126, the data engine 126 can provide responsive data 144 to the thermostat application 108. For example, a first application, such as the calendar application, can indicate that the user 102 is attending an event in at a particular location, such as San Francisco, on June 18th. Furthermore, a second application, such as a travel application of the applications 128, can indicate that a flight that the user 102 has booked is leaving at a particular time, such as 8:00 A.M., on June 18th. Additionally, a third application, such as a car rental application of the applications 128, can indicate that the user 102 is renting a car between two particular dates, such as from June 18th through June 25th. Therefore, the data engine 126 can generate responsive data 144 that characterizes a time range from June 18th through June 25th. Furthermore, the travel application can also indicate that another flight that the user 102 has booked is arriving back to a home city of the user 102 at a particular time, such as 7:00 P.M. on June 25th. This data can be characterized by the responsive data 144 and provided to the thermostat application 108. In some implementations, an arrangement of the responsive data 144 can be based on an application programming interface (API) for communicating between the automated assistant 130 and the thermostat application 108. Additionally, or alternatively, the arrangement of the responsive data 144 can be based on one or more APIs, and/or any other data organizing protocol for assisting with communications between applications. In some implementations, the format for the responsive data 144 can be based on content of the graphical user interface 106 such as, but not limited to, types of data capable of being input into the graphical user interface 106, natural language content presented at the graphical user interface 106, metadata of the thermostat application 108, historical interaction data between the user 102 and the automated assistant, and/or any other data that can be used as a basis for generating data.

Figure 2A:
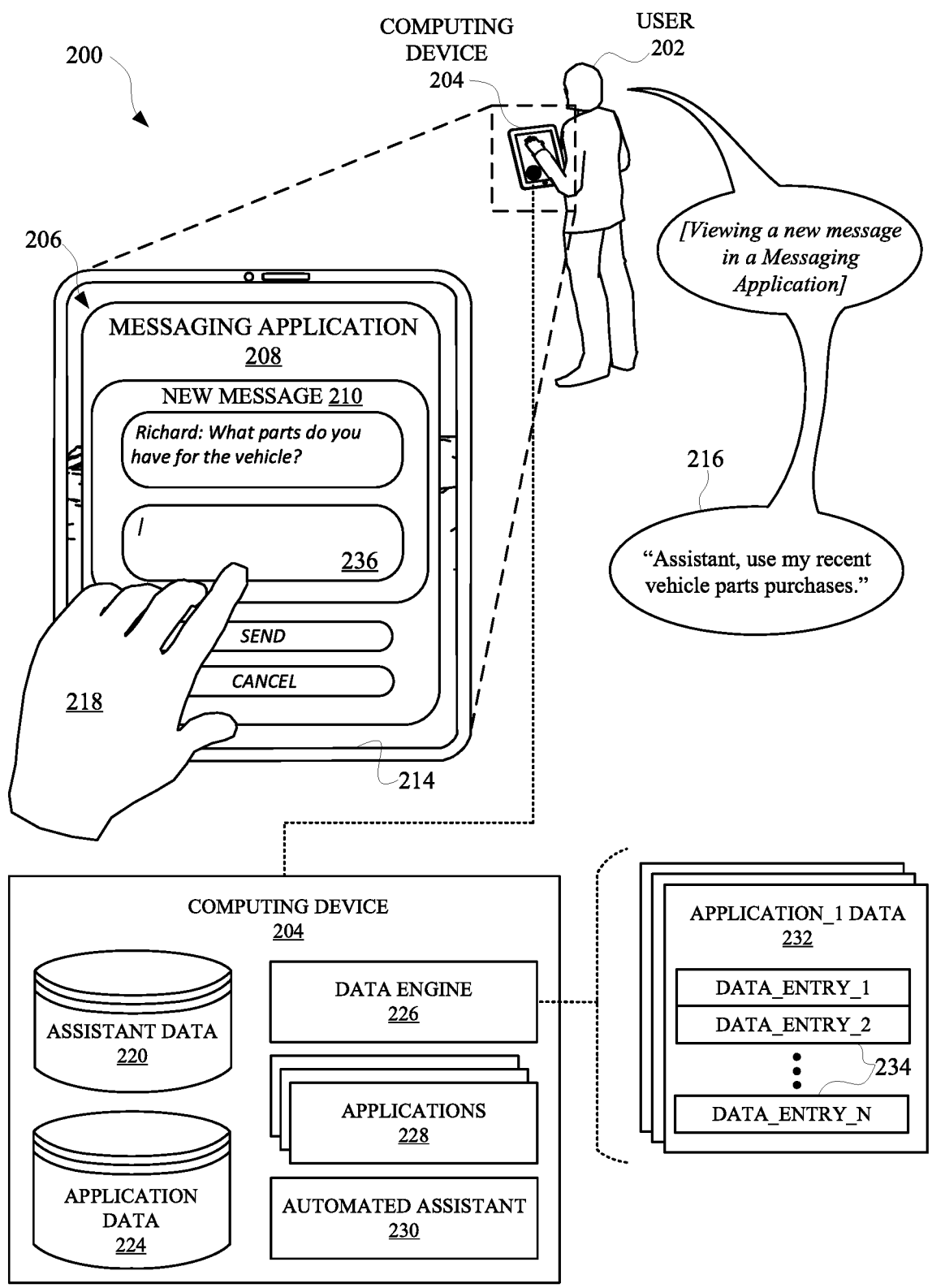
FIG. 2A and FIG. 2B illustrate an automated assistant being invoked in order to provide data from one or more applications and thereby assist the user with generating an input for a foreground application.
Figure 2B:
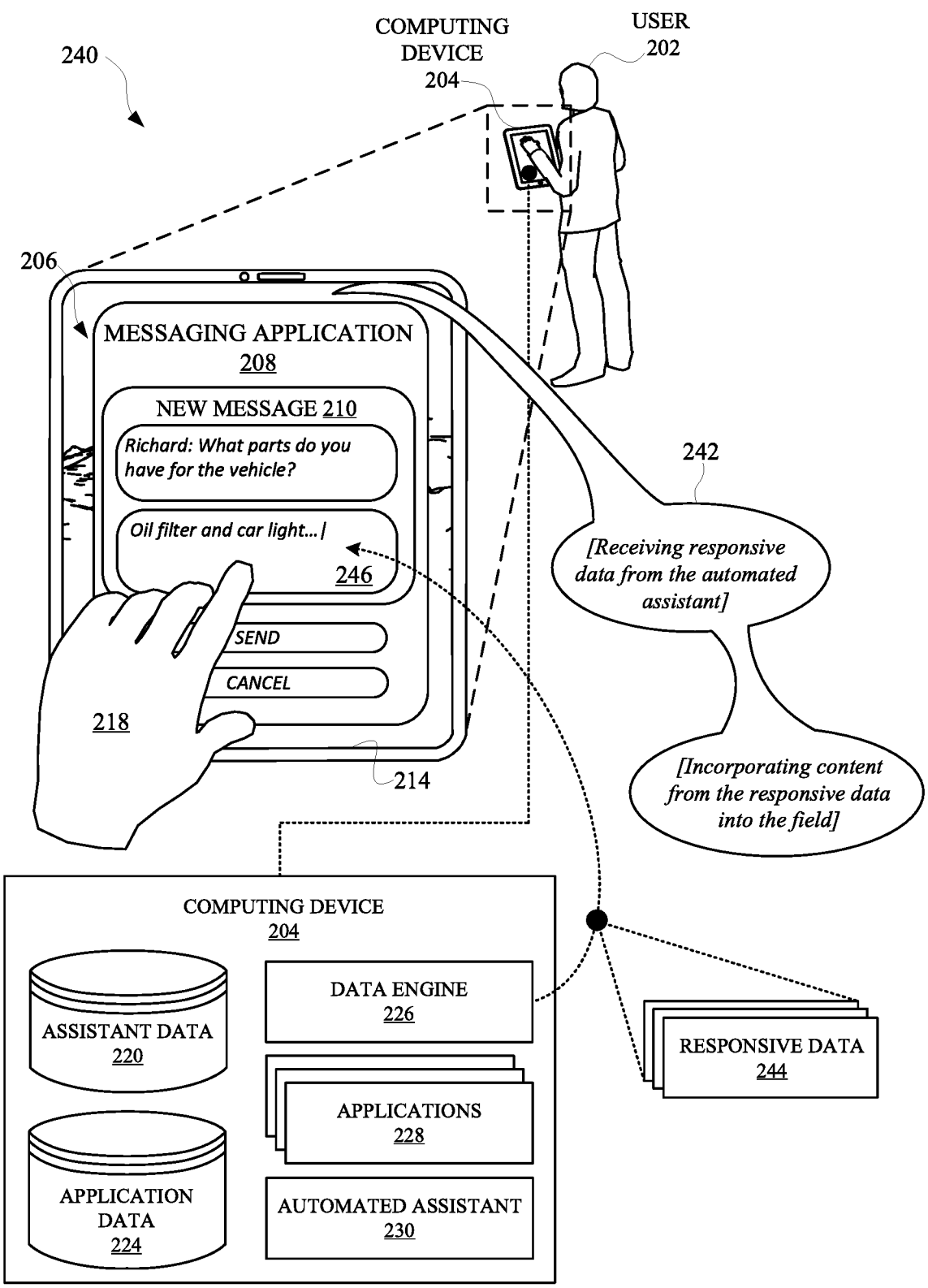

FIG. 2A and FIG. 2B illustrate a view 200 and a view 240, respectively, of an automated assistant 230 being invoked in order to provide data from one or more applications and thereby assist the user with generating an input for a foreground application. For example, the user 202 can be viewing a new message 210 in a messaging application 208, which can include an empty field 236 for providing a textual input for responding to the new message 210. The user 202 can select the empty field 236 via a touch input with their hand 218 and invoke the automated assistant 230 using a spoken utterance 216 in order to request for assistance with filling the empty field. For example, the user 202 can provide a spoken utterance 216 such as, "Assistant, use my recent vehicle parts purchases."

In response to the spoken utterance 216, the automated assistant 230 can process audio data corresponding to the spoken utterance 216 using speech to text processing and/or natural language understanding processing at the computing device 204. Based on processing the audio data corresponding to the spoken utterance 216, the automated assistant 230 can employ a data engine 226 for compiling data that can be used by the messaging application 208. Specifically, the data engine 226 can access assistant data 220 and/or application data 224 provided by one or more applications 228 available via the computing device 204. For example, the assistant data 220 can include data that characterizes one or more previous interactions between the automated assistant 230 and the user 202. Furthermore, the application data 224 can correspond to data generated by one or more applications 228 based on input from the user 202 and/or other operations performed by the one or more applications 228.

The data engine 226 can process the assistant data 220 to identify data associated with the request from the user 202 provided via the spoken utterance 216. Specifically, the data engine 226 can query the automated assistant 230 to provide assistant data that is associated with recent vehicle parts purchases. In response to providing the query, the data engine 226 can receive certain assistant data corresponding to previous interactions in which the user 202 requested the automated assistant 230 to order new car lights from a car parts website (e.g., "Assistant, order car lights for my 2012 EV"). Furthermore, the data engine 226 can provide one or more requests to one or more applications 228 in order to retrieve application data 224 associated with recent vehicle parts purchases. For example, the one or more applications 228 can include a shopping application and a vehicle maintenance application. In response to each application receiving a respective query from the data engine 226, the shopping application can provide order details for an order associated with the phrase "vehicle parts." Additionally, the vehicle maintenance application can provide part details related to parts of a vehicle owned by the user 202. For example, data provided by the vehicle maintenance application can identify a type of oil filter that needs to be replaced on the vehicle of the user 202.

Using the data from the assistant data 220 and the application data 224, the data engine 226 can generate application data 232 that includes data entries 234, which can be based on data received by the data engine 226 in response to sending the queries to the automated assistant 230 and the applications 228. In some implementations, the data engine 226 can further process the application data 232 in order to filter and/or rank the application data 232 according to a relevance of the application data 232 to the content of the spoken utterance 216 and/or content of a graphical user interface 206 rendered at a display panel 214 of the computing device 204. Based on the relevance and/or ranking of the application data 232, the automated assistant 230 can identify one or more sources of application data to rely upon for providing to the messaging application 208. For example, data entries 234 can be selected from one or more highest ranked and/or most relevant sources of application data. Alternatively, or additionally, the application data 232 can be ranked and/or prioritized according to relevance of the data entries 234 to the content of the spoken utterance 216 and/or other content rendered at the graphical user interface 206. For example, data from a subset of the applications 228, such as data from the shopping application and data from the vehicle maintenance application, can be considered more relevant than any other data provided by the one or more applications 228. Based on this determination, the data engine 226 can generate responsive data 244 and provide the responsive data 244 to the messaging application 208, as indicated in view 240 of FIG. 2B.

The responsive data 244 can be provided to the messaging application 208 and rendered at the graphical user interface 206. In some implementations, the responsive data 244 can be rendered as natural language content in one or more fields 246 of the messaging application 208. For example, a field 246 for providing a response to the new message 210 can incorporate content that is based on the responsive data 244. The messaging application 208 can use the responsive data 244 in order to incorporate content into the field 246 of the new message 210. For example, the message may comprise two items of content, such as "Oil filter and car light,", which can correspond to data provided by two different applications in response to the request from the data engine 226. By providing the content into the field of the new message 210, the user 202 can be afforded the opportunity to edit the content, and/or add or remove content from the field 246. In some implementations, content provided into a respected field can be tagged to identify a source of the respective content. For example, the phrase "oil filter" can be tagged with an identifier that identifies the vehicle maintenance application as the source of the content, and the phrase "car light" can be tagged with an identifier that identifies the automated assistant and/or the car parts website as the source of the content. In this way, should the automated assistant 230 incorporate content that may seem relevant to the spoken utterance from the user, but that is provided by an application that is not particularly relevant to the spoken utterance (e.g., a dating application), the user can quickly identify the source of the content in order to remove and/or modify the content. This can improve robustness of various applications, as many on-device applications can cooperate with other applications via the automated assistant 230. Furthermore, this can preserve computational resources that might otherwise be wasted switching between applications, and/or otherwise providing duplicative information to an application when that information may already be available to a separate application.

Figure 3:
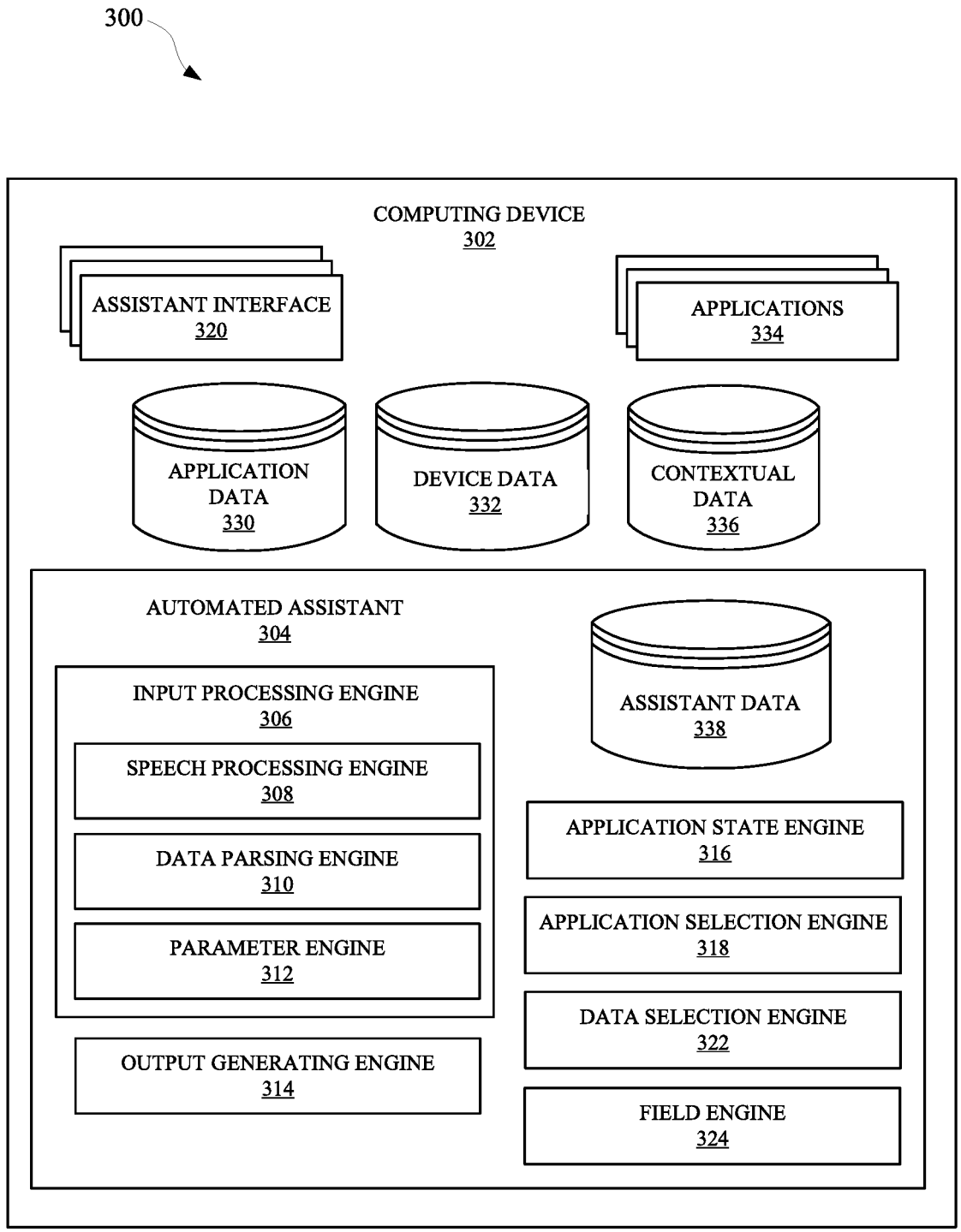
FIG. 3 illustrates a system for providing an automated assistant that can assist a user with providing, to a foreground application, inputs using content from multiple other applications that are available at a computing device.

FIG. 3 illustrates a system 300 for providing an automated assistant that can assist a user with providing, to a foreground application, inputs using content from multiple other applications that are available at a computing device 302. The automated assistant 304 can operate as part of an assistant application that is provided at one or more computing devices, such as a computing device 302 and/or a server device. A user can interact with the automated assistant 304 via assistant interface(s) 320, which can be a microphone, a camera, a touch screen display, a user interface, and/or any other apparatus capable of providing an interface between a user and an application. For instance, a user can initialize the automated assistant 304 by providing a verbal, textual, and/or a graphical input to an assistant interface 320 to cause the automated assistant 304 to perform a function (e.g., provide data, control a peripheral device, access an agent, generate an input and/or an output, etc.). The computing device 302 can include a display device, which can be a display panel that includes a touch interface for receiving touch inputs and/or gestures for allowing a user to control applications 334 of the computing device 302 via the touch interface. In some implementations, the computing device 302 can lack a display device, thereby providing an audible user interface output, without providing a graphical user interface output. Furthermore, the computing device 302 can provide a user interface, such as a microphone, for receiving spoken natural language inputs from a user. In some implementations, the computing device 302 can include a touch interface and can be void of a camera, but can optionally include one or more other sensors.

The computing device 302 and/or other third party client devices can be in communication with a server device over a network, such as the interne. Additionally, the computing device 302 and any other computing devices can be in communication with each other over a local area network (LAN), such as a Wi-Fi network. The computing device 302 can offload computational tasks to the server device in order to conserve computational resources at the computing device 302. For instance, the server device can host the automated assistant 304, and/or computing device 302 can transmit inputs received at one or more assistant interfaces 320 to the server device. However, in some implementations, the automated assistant 304 can be hosted at the computing device 302, and various processes that can be associated with automated assistant operations can be performed at the computing device 302.

In various implementations, all or less than all aspects of the automated assistant 304 can be implemented on the computing device 302. In some of those implementations, aspects of the automated assistant 304 are implemented via the computing device 302 and can interface with a server device, which can implement other aspects of the automated assistant 304. The server device can optionally serve a plurality of users and their associated assistant applications via multiple threads. In implementations where all or less than all aspects of the automated assistant 304 are implemented via computing device 302, the automated assistant 304 can be an application that is separate from an operating system of the computing device 302 (e.g., installed "on top" of the operating system)—or can alternatively be implemented directly by the operating system of the computing device 302 (e.g., considered an application of, but integral with, the operating system).

In some implementations, the automated assistant 304 can include an input processing engine 306, which can employ multiple different modules for processing inputs and/or outputs for the computing device 302 and/or a server device. For instance, the input processing engine 306 can include a speech processing engine 308, which can process audio data received at an assistant interface 320 to identify the text embodied in the audio data. The audio data can be transmitted from, for example, the computing device 302 to the server device in order to preserve computational resources at the computing device 302. Additionally, or alternatively, the audio data can be exclusively processed at the computing device 302.

The process for converting the audio data to text can include a speech recognition algorithm, which can employ neural networks, and/or statistical models for identifying groups of audio data corresponding to words or phrases. The text converted from the audio data can be parsed by a data parsing engine 310 and made available to the automated assistant 304 as textual data that can be used to generate and/or identify command phrase(s), intent(s), action(s), slot value(s), and/or any other content specified by the user. In some implementations, output data provided by the data parsing engine 310 can be provided to a parameter engine 312 to determine whether the user provided an input that corresponds to a particular intent, action, and/or routine capable of being performed by the automated assistant 304 and/or an application or agent that is capable of being accessed via the automated assistant 304. For example, assistant data 338 can be stored at the server device and/or the computing device 302, and can include data that defines one or more actions capable of being performed by the automated assistant 304, as well as parameters necessary to perform the actions. The parameter engine 312 can generate one or more parameters for an intent, action, and/or slot value, and provide the one or more parameters to an output generating engine 314. The output generating engine 314 can use the one or more parameters to communicate with an assistant interface 320 for providing an output to a user, and/or communicate with one or more applications 334 for providing an output to one or more applications 334.

In some implementations, the automated assistant 304 can be an application that can be installed "on-top of" an operating system of the computing device 302 and/or can itself form part of (or the entirety of) the operating system of the computing device 302. The automated assistant application includes, and/or has access to, on-device speech recognition, on-device natural language understanding, and on-device fulfillment. For example, on-device speech recognition can be performed using an on-device speech recognition module that processes audio data (detected by the microphone(s)) using an end-to-end speech recognition machine learning model stored locally at the computing device 302. The on-device speech recognition generates recognized text for a spoken utterance (if any) present in the audio data. Also, for example, on-device natural language understanding (NLU) can be performed using an on-device NLU module that processes recognized text, generated using the on-device speech recognition, and optionally contextual data, to generate NLU data. NLU data can include intent(s) that correspond to the spoken utterance and optionally parameter(s) (e.g., slot values) for the intent(s). On-device fulfillment can be performed using an on-device fulfillment module that utilizes the NLU data (from the on-device NLU), and optionally other local data, to determine action(s) to take to resolve the intent(s) of the spoken utterance (and optionally the parameter(s) for the intent). This can include determining local and/or remote responses (e.g., answers) to the spoken utterance, interaction(s) with locally installed application(s) to perform based on the spoken utterance, command(s) to transmit to Internet-of-things (IoT) device(s) (directly or via corresponding remote system(s)) based on the spoken utterance, and/or other resolution action(s) to perform based on the spoken utterance. The on-device fulfillment can then initiate local and/or remote performance/execution of the determined action(s) to resolve the spoken utterance.

In various implementations, remote speech processing, remote NLU, and/or remote fulfillment can at least selectively be utilized. For example, recognized text can at least selectively be transmitted to remote automated assistant component(s) for remote NLU and/or remote fulfillment. For instance, the recognized text can optionally be transmitted for remote performance in parallel with on-device performance, or responsive to failure of on-device NLU and/or on-device fulfillment. However, on-device speech processing, on-device NLU, on-device fulfillment, and/or on-device execution can be prioritized at least due to the latency reductions they provide when resolving a spoken utterance (due to no client-server roundtrip(s) being needed to resolve the spoken utterance). Further, on-device functionality can be the only functionality that is available in situations with no or limited network connectivity.

In some implementations, the computing device 302 can include one or more applications 334 which can be provided by a third-party entity that is different from an entity that provided the computing device 302 and/or the automated assistant 304. An application state engine 316 of the automated assistant 304 and/or the computing device 302 can access application data 330 to determine one or more actions capable of being performed by one or more applications 334, as well as a state of each application of the one or more applications 334. Furthermore, the application data 330 and/or any other data (e.g., device data 332) can be accessed by the automated assistant 304 to generate contextual data 336, which can characterize a context in which a particular application 334 is executing at the computing device 302 and/or a particular user is accessing the computing device 302.

While one or more applications 334 are executing at the computing device 302, the device data 332 can characterize a current operating status of each application 334 executing at the computing device 302. Furthermore, the application data 330 can characterize one or more features of an executing application 334, such as content of one or more graphical user interfaces being rendered at the direction of one or more applications 334. Alternatively, or additionally, the application data 330 can characterize an action schema, which can be updated by a respective application and/or by the automated assistant 304, based on a current operating status of the respective application. Alternatively, or additionally, one or more action schemas for one or more applications 334 can remain static, but can be accessed by the application state engine 316 in order to determine a suitable action to initialize via the automated assistant 304.

In some implementations, the automated assistant 304 can initialize performance of one or more actions of an application 334, regardless of whether a particular graphical control for the one or more actions is being rendered had a graphical user interface of the computing device 302. In some implementations, the application state engine 316 can determine a state of an application 334 in response to an input from a user to the automated assistant 304. For example, the user can provide an input to the automated assistant 304 for requesting assistance with providing input data to an application 334 that the user is interacting with. For instance, the user can provide a spoken utterance such as, "Assistant, use my recent map data," when responding to an incoming message such as, "Hey, what have you been up to today?" from a friend, while using a messaging application. In response to receiving the spoken utterance, the automated assistant 304 can employ the application state engine 316 to determine a state of the messaging application. The state of the messaging application can characterize content of a graphical user interface that the user is viewing, and/or one or more fields of the graphical user interface that the user is viewing.

Based on identifying the application state and processing the spoken utterance from the user, the automated assistant 304 can determine that the user is requesting assistance filling out one or more fields of the messaging application. In some implementations, in order to provide this assistance, the automated assistant 304 can employ an application selection engine 318. The application selection engine 318 can identify one or more applications 334 to request application data 330 from in order to assist the user with filling out the one or more fields. For example, the application selection engine 318 can use content of the spoken utterance, content of the graphical user interface determined by the application state engine 316, contextual data 336, assistant data 338, and/or any other data in order to identify one or more applications 334 suitable for requesting responsive data from in order to assist the user with filling out the one or more fields.

When one or more applications 334 have been selected for assisting the user with filling out the one or more fields of the messaging application, the automated assistant 304 can employ a data selection engine 322 for requesting data from applications selected by the application selection engine 318. For example, the data selection engine 322 can generate one or more requests to be provided to a first application and a second application selected by the application selection engine 318. In some implementations, a request generated by the data selection engine 322 can be based on content rendered at the graphical user interface by the messaging application and/or content of the spoken utterance provided by the user. For example, the request can include a data type identifier such as location data, and/or a distance type identifier for identifying distance related data. The automated assistant 304 can provide the request to the selected applications and, in response, receive responsive data from the selected applications.

When the automated assistant 304 receives the responsive data from the selected applications, the automated assistant 304 can employ a field engine 324 for generating instructions for the messaging application to use the responsive data to incorporate content into one or more fields of the messaging application. For example, the responsive data can be provided by a first application, such as a GPS application, and a second application, such as an exercise application. The automated assistant 304 can be invoked in order to provide content to a "message body field" rendered at a graphical user interface of the messaging application. Therefore, in order to generate instructions for the messaging application to incorporate the responsive data into the "message body field," the automated assistant 304 and employ the field engine 324 to generate suitable instructions for directing the messaging application to incorporate the responsive data into the "message body field" of the messaging application. For example, the instructions can correspond to a command of such as, "{EDIT_MESSAGE(Body_Field: "Home and University" && "6218 steps")}," which can cause the messaging application to edit the message body field to include natural language content such as "Home and University, and 6,218 steps." The automated assistant 304 can provide the command to the messaging application, which can incorporate the natural language content into the message body field.

In some implementations, content incorporated into one or more fields of a foreground application at the request of a user can be modified prior to one or more actions being performed by the foreground application using the content. For example, when the natural language content is incorporated by the messaging application into the "message body field," the user can be provided an opportunity to access the natural language content in order to edit, add, and/or remove any content. In some implementations, when a user edits certain content corresponding to a particular application source, contextual data 336 can be generated to reflect that the user requested assistance for filling out fields of a particular foreground application but edited content that was provided by another application source. In this way, one or more machine learning models can be trained based on the contextual data 336 in order that subsequent assistance provided by the automated assistant 304 can be based on the trained machine learning model and previous interactions between the user and the automated assistant 304.

Furthermore, in some implementation, the automated assistant 304 can provide suggestions for incorporating content into a particular field, and each suggestion of the suggestions can be selected or unselected, in order to indicate whether the user would like the content to be incorporated into a particular field. For example, the automated assistant 304 can generate a graphical suggestion element corresponding to the "Home and University" content that is based on the first application data (in this case the GPS application data), and another graphical suggestion element corresponding to the "6,218 steps" content that is based on the second application data (in this case the exercise application data). Each graphical suggestion element can include a checkbox or other selectable element which can be toggled in order to indicate whether the user would like their respective content to be incorporated into a respective field or not. Therefore, if the user selects both check boxes, both content from both the first and second applications (in this case the GPS application and the exercise application) can be incorporated into the "message body field." However, when the user only selects the check box corresponding to the first (GPS) application data, the "Home and University" content can be incorporated into the "message body field" without the "2,618 steps" content from the second (exercise) application. This can substantially reduce a number of inputs that would be processed in order to incorporate the content into the field, thereby preserving computational resources at the computing device 302. Furthermore, this can reduce latency that might otherwise be exhibited by an automated assistant that is being tasked with processing redundant inputs to fields or applications, such as if the user previously typed "university" into a field of the GPS application, and then subsequently also typed "university" into a field of the messaging application.

Figure 4:
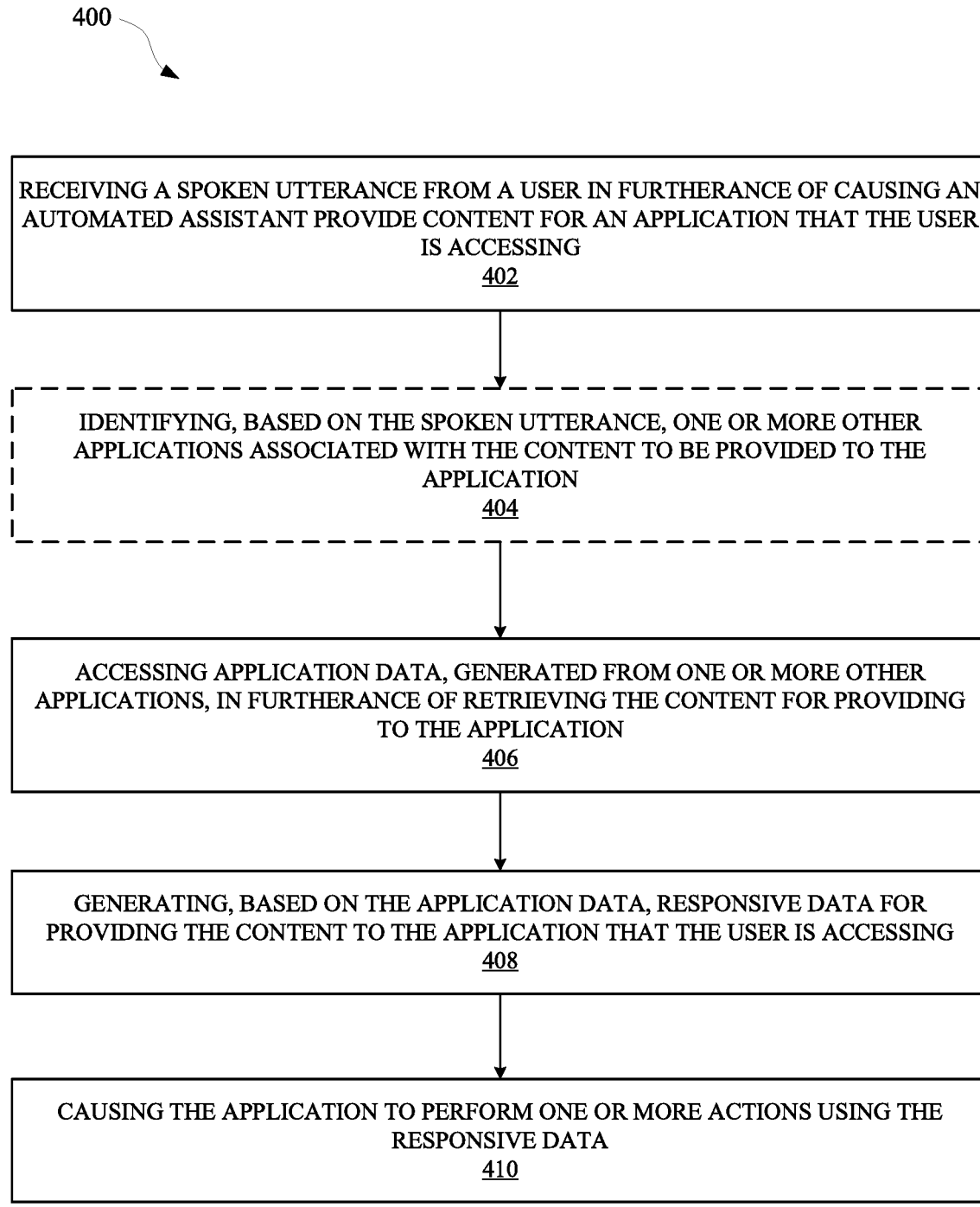

FIG. 4 illustrates a method 400 for invoking an automated assistant to retrieve data from one or more different applications, and then provide the retrieved data to an application that a user is interacting with. The method 400 can be performed by one or more computing devices, applications, and/or any other apparatus or module that can be associated with an automated assistant. The method 400 can include an operation 402 of receiving a spoken utterance from a user in furtherance of causing an automated assistant to provide content for an application that the user is accessing. The application can be, for example, a messaging application in which the user is messaging with a family member, and the family member has asked the user a question such as, for example, "What are your plans for next weekend?" In response to receiving the question via a message in the messaging application, the user can invoke the automated assistant to provide content for use in a response. For example, the user can provide a spoken utterance such as, "Assistant, provide my plans for next weekend."

The method 400 can further include an optional operation 404 of identifying, based on the spoken utterance, one or more other applications associated with the content to be provided to the application. The automated assistant can access an index of applications accessible via the computing device (e.g. locally installed on the computing device), and identify one or more other applications that are most correlated to the content of the spoken utterance and/or the content rendered at the graphical user interface (e.g., the message received from the family member) of the application. For example, the automated assistant can identify another messaging application and a calendar application as being correlated to the content of the application and/or the spoken utterance. The other messaging application can be considered correlated to the spoken utterance and/or the application content because another message in the other messaging application includes a message that contains the text, "Saturday morning I'm grabbing coffee with Sam."

Furthermore, the calendar application can be considered correlated to the spoken utterance and/or the application content because multiple different entries stored via the calendar application detail at least one upcoming event for next weekend (e.g., "Dinner on the dock on Friday.").

The method 400 can further include an operation 406 of accessing application data, generated from one or more other applications, in furtherance of retrieving content for providing to the application. The application data accessed by the automated assistant can include, with prior permission from the user, text of one or more messages of the messaging application, and details of one or more events stored via the calendar application. In some implementations, the application data provided by one or more other applications can be filtered and/or ranked according to a correlation between certain application data and the content of the spoken utterance and/or the content of the application that the user is interacting with. In this way, most relevant application data can be provided to the user and/or the application for provisioning to the application in furtherance of the application performing one or more actions using the most relevant application data.

The method 400 can further include an operation 408 of generating, based on the application data, responsive data for use when providing the content to the application that the user is accessing. In some implementations, generating the responsive data can include generating one or more requests for the application using an application programming interface (API). In some implementations, the application data used when generating the responsive data can include structured and/or unstructured data. For example, at least some amount of the application data can be structured according to a schema for organizing data in a way that can be more readily parsed by a variety of different applications. Furthermore, at least some amount of the data can be unstructured, and, therefore, this unstructured data can be further processed in order to provide suitable responsive data from the unstructured data. For example, the calendar application can provide structured data that is arranged according to a schema, and the messaging application can provide unstructured data that details, with prior permission from the user, recently received messages. The unstructured data can be processed according to a natural language understanding process, via which the unstructured data is converted into structured data that can be provided to the application, and/or otherwise satisfy the command from the user.

The method 400 can further include an operation 410 of causing the application to perform one or more actions using the responsive data. For example, in response to receiving the spoken utterance from the user, the automated assistant can incorporate content into a graphical user interface of the application based on the responsive data. For example, content provided to the interface of the application can include natural language content incorporated into a "Body" field of a "Response Message" for responding to the message from the family member. For instance, the automated assistant can generate content such as "{Body: ("Saturday morning I'm grabbing coffee with Sam, and Dinner on the dock on Friday.")}." The content can be rendered within the body field of the graphical user interface in order that the user can confirm and/or edit the content prior to sending the response message. Additionally, or alternatively, the automated assistant can transmit the message in response to receiving the spoken utterance from the user. In this way, the user can mitigate wasting of computational resources that might otherwise be consumed when the user switches between applications to glean information that they had already provided to one or more different applications.

Figure 5:
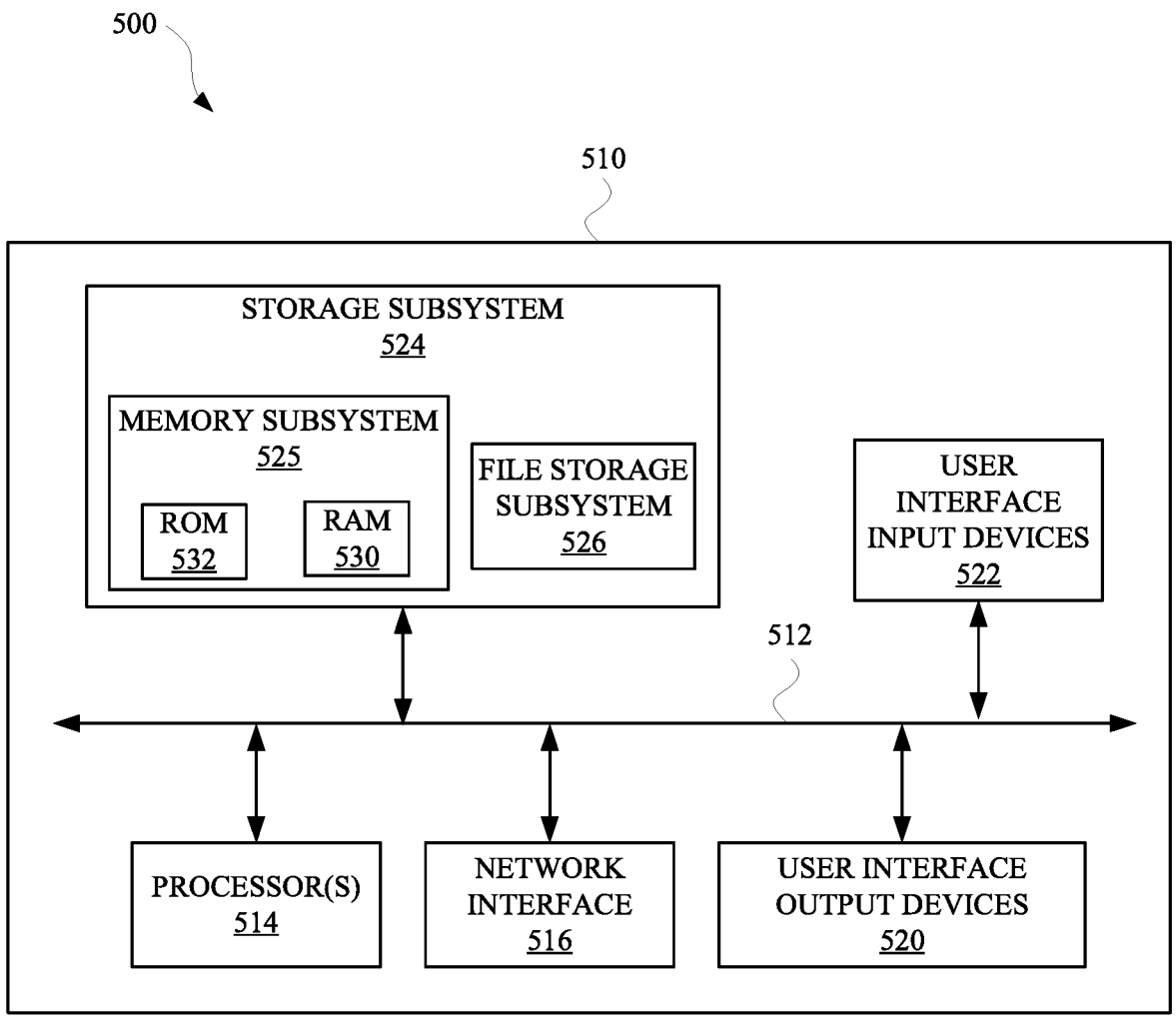
FIG. 5 is a block diagram of an example computer system.

FIG. 5 is a block diagram of an example computer system 510. Computer system 510 typically includes at least one processor 514 which communicates with a number of peripheral devices via bus subsystem 512. These peripheral devices may include a storage subsystem 524, including, for example, a memory 525 and a file storage subsystem 526, user interface output devices 520, user interface input devices 522, and a network interface subsystem 516. The input and output devices allow user interaction with computer system 510. Network interface subsystem 516 provides an interface to outside networks and is coupled to corresponding interface devices in other computer systems.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 510 to the user or to another machine or computer system.

Storage subsystem 524 stores programming and data constructs that provide the functionality of some or all of the modules described herein. For example, the storage subsystem 524 may include the logic to perform selected aspects of method 400, and/or to implement one or more of system 300, computing device 104, computing device 302, automated assistant, and/or any other application, device, apparatus, and/or module discussed herein.

These software modules are generally executed by processor 514 alone or in combination with other processors. Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computer system 510 communicate with each other as intended. Although bus subsystem 512 is shown schematically as a single bus, alternative implementations of the bus subsystem may use multiple busses.

Computer system 510 can be of varying types including a workstation, server, computing cluster, blade server, server farm, or any other data processing system or computing device. Due to the ever-changing nature of computers and networks, the description of computer system 510 depicted in FIG. 5 is intended only as a specific example for purposes of illustrating some implementations. Many other configurations of computer system 510 are possible having more or fewer components than the computer system depicted in FIG. 5.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented by one or more processors is set forth as including operations such as receiving, by an automated assistant application of a computing device, audio data captured by one or more microphones of the computing device, wherein the audio data captures a spoken utterance of a user who is accessing a given application at the computing device, the given application being accessible separate from the automated assistant application. The operations can further include processing, by the automated assistant application using an on-device speech recognition engine, the audio data to generate textual data that corresponds to the spoken utterance. The operations can further include processing, by the automated assistant application using an on-device natural language understanding (NLU) engine, the textual data to generate NLU data that indicates the spoken utterance corresponds to a request for the automated assistant application to interact with the given application using content that is provided by one or more other applications that are different from the given application and the automated assistant application. The operations can further include, in response to the NLU data indicating that the spoken utterance corresponds to a request for the automated assistant application to interact with the given application using the content that is provided by the one or more other applications: generating, based on the textual data and/or the NLU data, an application data request for retrieving the content from the one or more other applications. The operations can further include providing the application data request to the one or more other applications, wherein the one or more other applications are a subset of a group of applications installed on the computing device. The operations can further include receiving, from one or more other applications, corresponding responsive data that is responsive to the application data request, and generating, by the automated assistant application and based on the responsive data from one or more other applications, content for interacting with the given application. The operations can further include providing, by the automated assistant application to the given application, an application command that includes the content and that causes the given application to perform one or more actions based on the content.

In some implementations, the one or more actions include incorporating the content into one or more editable fields rendered at a graphical user interface of the given application. In some implementations, the method can further include receiving, subsequent to providing the application command to the given application, a user input for modifying a portion of field content incorporated into an input field rendered at a graphical user interface of the given application. In some implementations, the portion of the field content modified by the user input corresponds to a portion of application data provided by multiple different applications of the one or more other applications. In some implementations, the audio data captures the spoken utterance being received simultaneous to the user accessing a graphical user interface being rendered in a foreground of a display panel that is connected to the computing device.

In some implementations, the one or more other applications include a first application and a second application that are accessible separate from the automated assistant application and the given application. In some implementations, the content is based on first application data that is provided by the first application and is formatted according to a data organizing protocol, and the content is also based on second application data that is provided by the second application and is not formatted according to the data organizing protocol. In some implementations, generating the content for interacting with the given application is further based on assistant data that characterizes a previous interaction between the user and the automated assistant, and/or based on contextual data that characterizes a current context in the user provided the spoken utterance to the automated assistant. In some implementations the given application is provided by an entity that is different from another entity that provided the automated assistant, or the given application is provided by a third party entity that is different from a separate entity that provided the automated assistant.

In other implementations, a method implemented by one or more processors is set forth as including operations such as receiving, via an automated assistant interface of a computing device, a spoken utterance from a user who is accessing an application via the computing device. The spoken utterance can correspond to a request from the user for an automated assistant to insert field content into one or more application fields being rendered at a graphical user interface of the application. In some implementations, the method can further include accessing, in response to receiving the spoken utterance via the automated assistant interface, application data in furtherance of retrieving field content for the one or more application fields, wherein the application data is provided by one or more other applications of the computing device. In some implementations, the method can further include generating, based on accessing the application data, responsive data for providing the content for the one or more application fields, wherein generating the responsive data includes retrieving data of the application data that is associated with application content being rendered at the graphical user interface of the application and natural language content embodied by the spoken utterance. In some implementations, the method can further include providing, based on generating the responsive data, the field content into one or more fields of the application; and causing, subsequent to providing the field content into the one or more fields of the application, the application to perform one or more actions using the field content.

In some implementations, the application data is provided by a first application of the one or more applications and a second application, which is different from the first application, of the one or more applications. In some implementations the application data includes first application data that is provided by a first application of the one or more applications and is formatted according to a data organizing protocol, and the application data includes second application data that is provided by a second application of the one or more applications and is not formatted according to the data organizing protocol. In some implementations, the one or more fields are editable and provide the user with access to the field content when the field content is incorporated into the one or more fields of the application. In some implementations, receiving, subsequent to providing the field content into the one or more fields of the application, a user input for modifying a portion of field content incorporated into a field of the one or more fields, wherein the portion of the field content modified by the user input corresponds to a portion of application data provided by multiple different applications of the one or more applications. In some implementations, the application is provided by an entity that is different from another entity that provided the automated assistant, or the application is provided by a third party entity that is different from a separate entity that provided the automated assistant.

In yet other implementations, a method implemented by one or more processors as including operation such as receiving, at a selected application from an automated assistant that is provided at a computing device, a request to provide responsive data in furtherance of assisting the automated assistant with providing content to a foreground application executing at the computing device, wherein the request identifies a type of content that is being requested by the automated assistant. In some implementations, the operations can further include determining, in response to receiving the request to provide responsive data, whether application data corresponding to the selected application correlates to the type of content that is being requested by the automated assistant. In some implementations, the method can further include, when the application data corresponding to the selected application is determined to correlate to the type of content: generating, based on the application data correlating to the type of content, the responsive data for use by the automated assistant when providing content to the foreground application, providing, in response to the automated assistant providing the request to the selected application, the responsive data to the automated assistant, wherein the responsive data identifies the type of content requested by the automated assistant, and causing, based on the automated assistant receiving the responsive data, the automated assistant to provide content to the content to the foreground application using at least the responsive data. In some implementations, the foreground application, in response to receiving the content from the automated assistant, performs one or more actions using the content from the automated assistant.

In some implementations, the request further identifies natural language content rendered at a graphical user interface of the foreground application, and the method further comprises: determining, in response to receiving the request to provide responsive data, whether application data corresponding to the selected application is associated with the natural language content that is being rendered at the graphical user interface of the foreground application. In some implementations, the request further identifies at least one field of one or more fields selected by a user and rendered at a graphical user interface of the foreground application, and the method further comprises: determining, in response to receiving the request to provide responsive data, whether application data corresponding to the selected application is associated with the at least one field of one or more fields selected by a user. In some implementations, the type of content requested by the automated assistant characterizes certain content that the at least one field of the one or more fields is configured to receive as input. In some implementations, the selected application is provided by an entity that is different from an entity that provided the automated assistant, or the selected application is provided by a third party entity that is different from an entity that provided the automated assistant. In some implementations, the responsive data is generated at the computing device and the responsive data is provided to the automated assistant via the computing device.

In yet other implementations, a method implemented by one or more processors of a client device is set forth as including operations such as receiving, by an automated assistant application of the client device, audio data captured by one or more microphones of the client device, wherein the audio data captures a spoken utterance of a user. The operations can further include processing, by the automated assistant application using an on-device speech recognition engine, the audio data to generate textual data that corresponds to the spoken utterance. The operations can further include processing, by the automated assistant application using an on-device natural language understanding (NLU) engine, the textual data to generate NLU data that indicates the spoken utterance corresponds to a request for content that is provided by one or more other applications that are different from automated assistant application. The operations can further include, in response to the NLU data indicating that the spoken utterance corresponds to a request for the automated assistant application to interact with the given application using the content that is provided by the one or more other applications: selecting a subgroup of applications installed on the client device, selecting the subgroup based on comparison of: locally stored attributes for the applications, to the textual data and/or the NLU data, generating, based on the textual data and/or the NLU data, an application data request for retrieving the content from applications of the subgroup. The operations can further include providing the application data request to only the applications of the subgroup, receiving, from two or more of the applications of the subgroup, corresponding responsive data that is responsive to the application data request, and rendering, by the automated assistant application, graphical and/or audible output that is based on the responsive data.

We claim:

1. A method implemented by one or more processors, the method comprising:
    receiving, by an automated assistant application of a computing device, audio data captured by one or more microphones of the computing device, wherein the audio data captures a spoken utterance of a user who is accessing a given application at the computing device, the given application being accessible separate from the automated assistant application;
    processing, by the automated assistant application using an on-device speech recognition engine, the audio data to generate textual data that corresponds to the spoken utterance;
    processing, by the automated assistant application using an on-device natural language understanding (NLU) engine, the textual data to generate NLU data that indicates the spoken utterance corresponds to a request for the automated assistant application to interact with the given application using content that is provided by one or more other applications that are different from the given application and different from the automated assistant application;
    in response to the NLU data indicating that the spoken utterance corresponds to a request for the automated assistant application to interact with the given application using the content that is provided by the one or more other applications:
        generating, based on the textual data and/or the NLU data, an application data request for retrieving the content from the one or more other applications;
        providing the application data request to the one or more other applications, wherein the one or more other applications are a subset of a group of applications installed on the computing device, and wherein the one or more other applications include a first application and a second application that are accessible separate from the automated assistant application and the given application,
        receiving, from one or more of the other applications, corresponding responsive data that is responsive to the application data request,
        generating, by the automated assistant application and based on the responsive data from one or more other applications, content for interacting with the given application, and
        providing, by the automated assistant application to the given application, an application command that includes the content and that causes the given application to perform one or more actions based on the content.

2. The method of claim 1, wherein the one or more actions include incorporating the content into one or more editable fields rendered at a graphical user interface of the given application.

3. The method of claim 2, further comprising:
    receiving, subsequent to providing the application command to the given application, a user input for modifying a portion of field content incorporated into an input field rendered at a graphical user interface of the given application,
        wherein the portion of the field content modified by the user input corresponds to a portion of application data provided by multiple different applications of the one or more other applications.

4. The method of claim 1, wherein the audio data captures the spoken utterance being received simultaneous to the user accessing a graphical user interface being rendered in a foreground of a display panel that is connected to the computing device.

5. The method of claim 1,
    wherein the content is based on first application data that is provided by the first application and is formatted according to a data organizing protocol, and
    wherein the content is also based on second application data that is provided by the second application and is not formatted according to the data organizing protocol.

6. The method of claim 1, wherein generating the content for interacting with the given application is further based on assistant data that characterizes a previous interaction between the user and the automated assistant, and/or based on contextual data that characterizes a current context in which the user provided the spoken utterance to the automated assistant.

7. The method of claim 1, wherein the given application is provided by an entity that is different from another entity that provided the automated assistant, or the given application is provided by a third party entity that is different from a separate entity that provided the automated assistant.

8. The method of claim 1, further comprising:
    selecting the one or more other applications based on the one or more applications each being assigned, in storage locally at the computing device, to an application type determined to correspond to the textual data and/or the NLU data;
    wherein providing the application data request to the one or more other applications is responsive to selecting the one or more other applications.

9. The method of claim 1, wherein providing the application data request to the one or more other applications comprises providing the application data request to an operating system of the computing device along with one or more identifiers of the one or more other applications, and wherein the operating system of the computing device directly provides the application data request to each of the one or more other applications based on the one or more identifiers.

10. The method of claim 1, wherein receiving, from one or more of the other applications, corresponding responsive data that is responsive to the application data request comprises receiving responsive data from only a subgroup of the other applications.

11. A method implemented by one or more processors, the method comprising:
    receiving, via an automated assistant interface of a computing device, a spoken utterance from a user who is accessing an application via the computing device,
        wherein the spoken utterance corresponds to a request from the user for an automated assistant to insert field content into one or more application fields being rendered at a graphical user interface of the application;

accessing, in response to receiving the spoken utterance via the automated assistant interface, application data in furtherance of retrieving field content for the one or more application fields,
  wherein the application data is provided by one or more other applications of the computing device, including by a first application of the one or more applications and a second application, that is different from the first application, of the one or more applications;
generating, based on accessing the application data, responsive data for providing the content for the one or more application fields,
  wherein generating the responsive data includes retrieving data of the application data that is associated with application content being rendered at the graphical user interface of the application and natural language content embodied by the spoken utterance;
providing, based on generating the responsive data, the field content into one or more fields of the application; and
causing, subsequent to providing the field content into the one or more fields of the application, the application to perform one or more actions using the field content.

12. The method of claim 11,
wherein the application data includes first application data that is provided by the first application of the one or more applications and is formatted according to a data organizing protocol, and
wherein the application data includes second application data that is provided by the second application of the one or more applications and is not formatted according to the data organizing protocol.

13. The method of claim 11, wherein the one or more fields are editable and provide the user with access to the field content when the field content is incorporated into the one or more fields of the application.

14. The method of claim 13, further comprising:
receiving, subsequent to providing the field content into the one or more fields of the application, a user input for modifying a portion of field content incorporated into a field of the one or more fields,
  wherein the portion of the field content modified by the user input corresponds to a portion of application data provided by multiple different applications of the one or more applications.

15. The method of claim 11, wherein the application is provided by an entity that is different from another entity that provided the automated assistant, or the application is provided by a third party entity that is different from a separate entity that provided the automated assistant.

16. A method implemented by one or more processors, the method comprising:
receiving, at a selected application from an automated assistant that is provided at a computing device, a request to provide responsive data in furtherance of assisting the automated assistant with providing content to a foreground application executing at the computing device, wherein the request identifies one or more properties of content that is being requested by the automated assistant, and wherein the request is also provided to an additional selected application accessible separate from the automated assistant application and the foreground application;
determining, in response to receiving the request to provide responsive data, whether application data corresponding to the selected application correlates to one or more of the properties of content that is being requested by the automated assistant;
when the application data corresponding to the selected application is determined to correlate to one or more of the properties of content:
  generating, based on the application data correlating to one or more of the properties of content, the responsive data for use by the automated assistant when providing content to the foreground application,
  providing, in response to the automated assistant providing the request to the selected application, the responsive data to the automated assistant, and
  wherein, in response to receiving the responsive data, the automated assistant provides the content to the foreground application using at least the responsive data,
    wherein the foreground application, in response to receiving the content from the automated assistant, performs one or more actions using the content from the automated assistant.

17. The method of claim 16, wherein the request further identifies natural language content rendered at a graphical user interface of the foreground application, and the method further comprises:
determining, in response to receiving the request to provide responsive data, whether application data corresponding to the selected application is associated with the natural language content that is being rendered at the graphical user interface of the foreground application.

18. The method of claim 16, wherein the request further identifies at least one field of one or more fields selected by a user and rendered at a graphical user interface of the foreground application, and the method further comprises:
determining, in response to receiving the request to provide responsive data, whether application data corresponding to the selected application is associated with the at least one field of one or more fields selected by a user.

* * * * *